(12) United States Patent
McAllister et al.

(10) Patent No.: US 8,041,571 B2
(45) Date of Patent: Oct. 18, 2011

(54) APPLICATION OF SPEECH AND SPEAKER RECOGNITION TOOLS TO FAULT DETECTION IN ELECTRICAL CIRCUITS

(75) Inventors: Sarah C. McAllister, Ossining, NY (US); Tomasz J. Nowicki, Fort Montgomery, NY (US); Jason W. Pelecanos, Ossining, NY (US); Grzegorz M. Swirszcz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/620,173

(22) Filed: Jan. 5, 2007

(65) Prior Publication Data

US 2008/0167877 A1 Jul. 10, 2008

(51) Int. Cl.
*G10L 11/00* (2006.01)
*G10L 15/16* (2006.01)
*H02H 3/00* (2006.01)

(52) U.S. Cl. .......................... 704/270; 704/232; 361/42
(58) Field of Classification Search .................. 704/232; 361/42
See application file for complete search history.

(56) References Cited

U.S. PATENT DOCUMENTS

| | | | | |
|---|---|---|---|---|
| 5,602,709 | A * | 2/1997 | Al-Dabbagh | 361/85 |
| 5,734,575 | A * | 3/1998 | Snow et al. | 700/286 |
| 6,002,561 | A * | 12/1999 | Dougherty | 361/93.4 |
| 6,021,387 | A * | 2/2000 | Mozer et al. | 704/232 |
| 6,304,865 | B1 * | 10/2001 | Christensen et al. | 706/20 |
| 6,393,395 | B1 * | 5/2002 | Guha et al. | 704/232 |
| 6,453,248 | B1 * | 9/2002 | Hart et al. | 702/58 |
| 6,519,561 | B1 * | 2/2003 | Farrell et al. | 704/232 |
| 6,882,992 | B1 * | 4/2005 | Werbos | 706/48 |
| 6,885,320 | B2 * | 4/2005 | Kim | 341/67 |
| 2003/0130846 | A1 * | 7/2003 | King | 704/256 |

(Continued)

OTHER PUBLICATIONS

Jaehak Chung; Powers, E.J.; Mack Grady, W.; Bhatt, S.C.; , "Adaptive power-line disturbance detection scheme using a prediction error filter and a stop-and-go CA CFAR detector," Acoustics, Speech, and Signal Processing, 1999. ICASSP '99. Proceedings., 1999 IEEE International Conference on , vol. 3, No., pp. 1533-1536 vol. 3, Mar. 15-19, 1999.*

(Continued)

*Primary Examiner* — Richemond Dorvil
*Assistant Examiner* — Douglas Godbold
(74) *Attorney, Agent, or Firm* — Whitham, Curtis, Christofferson & Cook, P.C.; Stephen C. Kaufman

(57) ABSTRACT

A method and apparatus detect and localize electric faults in electrical power grids and circuit. High impedance faults are detected by analyzing data from remote sensor units deployed over the network using the algorithms of speech and speaker analysis software. This is accomplished by converting the voltage and/or current waveform readouts from the sensors into a digital form which is then transmitted to a computer located either near the sensors or at an operations center. The digitized data is converted by a dedicated software or software/hardware interface to a format accepted by a reliable and stable software solution, such as speech or speaker recognition software. The speech or speaker recognition software must be "trained" to recognize various signal patterns that either indicate or not the occurrence of a fault. The readout of the speech or speaker recognition software, if indicating a fault, is transmitted to a central processor and displayed to provide information on the most likely type of fault. Automatic or human decision is then implemented based on the generated information.

8 Claims, 4 Drawing Sheets

U.S. PATENT DOCUMENTS

| | | | |
|---|---|---|---|
| 2004/0030556 A1* | 2/2004 | Bennett | 704/270 |
| 2004/0083103 A1* | 4/2004 | Mozer et al. | 704/251 |
| 2006/0143005 A1* | 6/2006 | Hwang | 704/232 |
| 2007/0093977 A1* | 4/2007 | Yuan et al. | 702/58 |
| 2007/0213956 A1* | 9/2007 | Nasle et al. | 702/182 |
| 2008/0204054 A1* | 8/2008 | Wells | 324/713 |
| 2008/0232005 A1* | 9/2008 | Kuehnle et al. | 361/21 |

OTHER PUBLICATIONS

Ebron, S.; Lubkeman, D.L.; White, M.; , "A neural network approach to the detection of incipient faults on power distribution feeders," Power Delivery, IEEE Transactions on , vol. 5, No. 2, pp. 905-914, Apr. 1990.*

* cited by examiner

APPLICATION OF SPEECH AND SPEAKER RECOGNITION TOOLS TO FAULT DETECTION IN ELECTRICAL CIRCUITS

BACKGROUND OF THE INVENTION

1. Field of the Invention

The present application generally relates to the detection of high-impedance faults in electrical power grids and, more particularly, to the detection and localization of faults in electrical power grids and circuits by the analysis of data from sensors on remote units using speech or speaker recognition tools and transmitting qualified data as potentially representing a fault to a central processing unit which performs a detailed analysis of the transmitted data.

2. Background Description

High impedance faults are costly, dangerous to the equipment and a threat to human life. There is a huge diversity of phenomena classified as high impedance faults. These include, but are not limited to, a downed line, a tree branch touching a line, a broken insulator, and improper installation. As a result, there is no accepted scientific knowledge about the nature of high impedance fault detection.

Electrical power grids are extremely complicated, making the detection and localization of a high impedance fault difficult and problematic. Current methods of detection include circuit breakers tripping, readout from meters at the substation by human operators, and a telephone call from someone who noticed a fault. Interestingly, the last of these methods, e.g., a telephone call, is the most common method by which faults are detected and located. There have been attempts to use local sensors that automatically make a decision and either raise an alarm or disconnect a part of the grid. These attempts have proven to be unsatisfactory due to the lack of processing power and the ability to flexibly adapt to the specifics of a particular environment.

SUMMARY OF THE INVENTION

According to the present invention, there is provided an innovative solution to the high impedance fault detection problem by analyzing the data from remote sensor units deployed over the network using the algorithms of speech analysis software. This is accomplished by converting the voltage and/or current waveform readouts from the sensors into a digital form which is then transmitted to a computer located either near the sensors or at an operations center. This can be accomplished, for example, by broadband power line (BPL) technology or by wireless transmission. The digitized data is converted by a dedicated software or software/hardware interface to a format accepted by a reliable and stable software solution, such as speech recognition software or speaker recognition software. Both types of software use algorithms to recognize patterns of input waveforms to associate those patterns with data using databases; the former using words databases, and the latter using person databases. The algorithms of the software need to be appropriately pre-configured for the task within the scope of existing options, or slightly modified to suit the task adequately. That is, the speech recognition software or speaker recognition software must be "trained" to recognize various signal patterns that either indicates or not the occurrence of a fault. The readout of the speech or speaker recognition software, if indicating a fault, is transmitted to a central processor and display to provide information on the most likely type of fault and the most likely location of the fault. Automatic or human decision is then implemented based on the generated information.

There are many advantages to the approach taken by the present invention. These include automatic detection and localization of high impedance faults, high accuracy, fast response, flexibility and adaptability. Modifications and updates to the algorithms implemented are inexpensive and easy.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
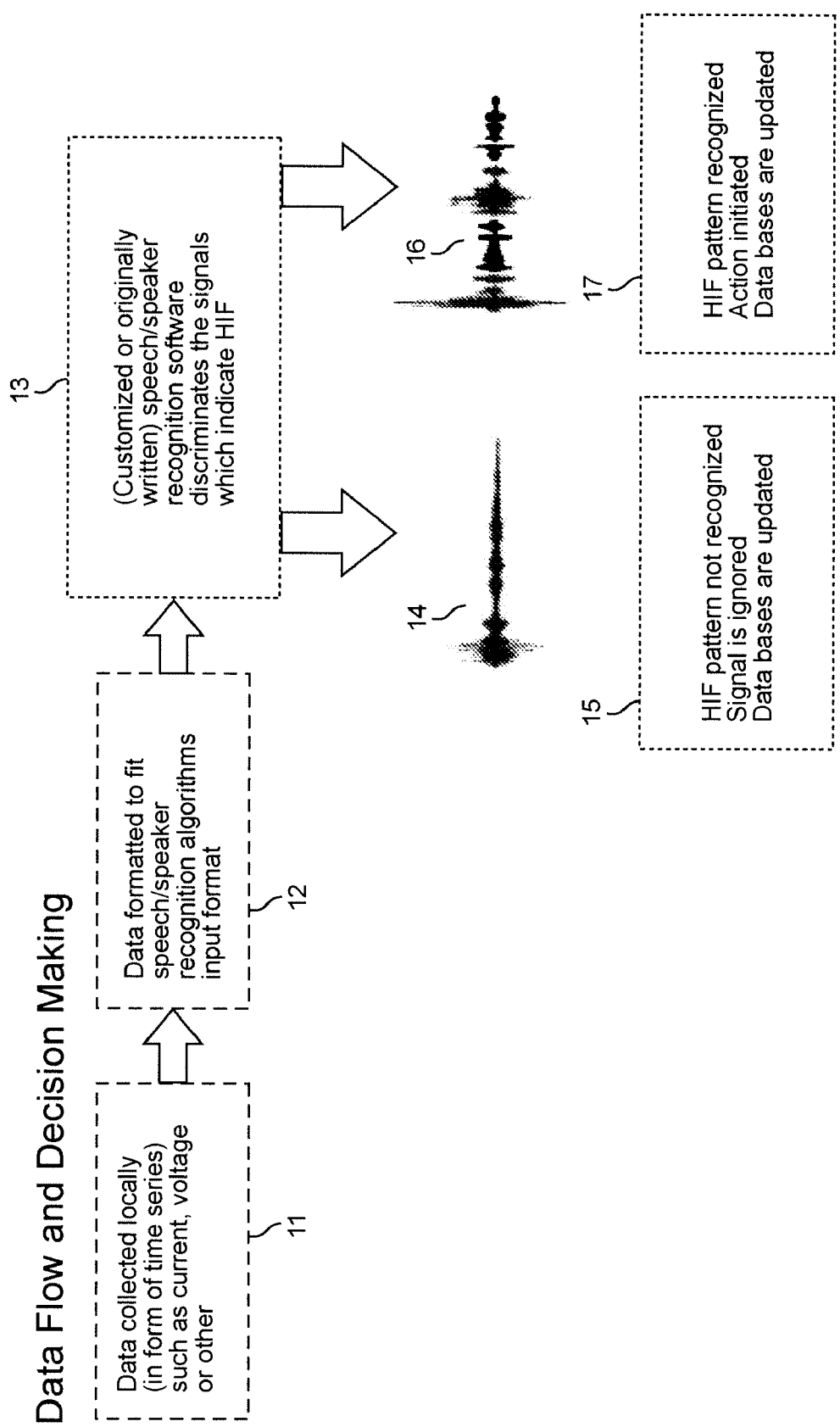
FIG. 1 is a high level block diagram illustrating the general concept of the two-stage high impedance fault detection system according to the invention.

Referring now to the drawings, and more particularly to FIG. 1, there is illustrated in block diagram from the basic concept of the high impedance fault detection system using speech or speaker recognition algorithms according to the invention. The first stage comprises a collection of voltage/current or other types of sensors deployed over the power grid. A single one of the sensors 11 is illustrated for the purposes of this description, but it will be understood that many such sensors are deployed over the entire grid. The readouts of each sensor is digitized and provided as a time stamped waveform of the signal sensed by the sensor. The faults occurring in the electrical circuits have acoustic features, not unlike human speech, that are well represented in fluctuations of the voltage and current. In other words, the waveforms originated by electrical circuits, after suitable transformations (either via a software or a hardware device), can be converted to acoustic waveforms and (after the conversion) have features which can be detected and/or analyzed by speech or speaker recognition software. Alternatively, the speech or speaker recognition software can be modified to accept waveforms which are not necessarily acoustically generated, but the software routines can be still applied. A processor unit 12 formats the data from the sensor to fit speech or speaker recognition algorithms input format. The formatted data is then input to customized or originally written speech recognition software 13. Such software is commercially available, including ViaVoice speech recognition software from International Business Machines Corp. (IBM) and Dragon Naturally Speaking software from Nuance. This software is "trained", as is done for speakers using such software, to recognize various waveform patterns. Two such patterns are shown in FIG. 1. In the case of pattern 14, the output of the speech or speaker recognition software is that a high impedance fault (HIF) is not recognized at 15. Therefore, the signal is ignored and not further processed except to update databases. However, in the case of the pattern 16, a HIF pattern is recognized at 17. When such a pattern is recognized, automatic or human action is initiated, and databases are updated.

The speech or speaker recognition software may be implemented either locally, at a central station, or remotely, near a plurality of sensors installed on the power line grid. If implemented remotely, a processor may be provided for a plurality of sensors in a particular region. The processor would poll the sensors on a periodic basis, subject to an interrupt signal from a sensor detecting an abnormal condition. The processor would then transmit only that data to a central processor which has been recognized as a high impedance fault (HIF). Likewise, the central processor would poll the remote processors on a periodic basis, again subject to an interrupt signal from a processor which has recognized a high impedance fault. If the speech or speaker recognition software is implemented at the central processor, the sensors would be polled periodically to obtain the digitized and time stamped waveforms from each sensor.

Figure 2:
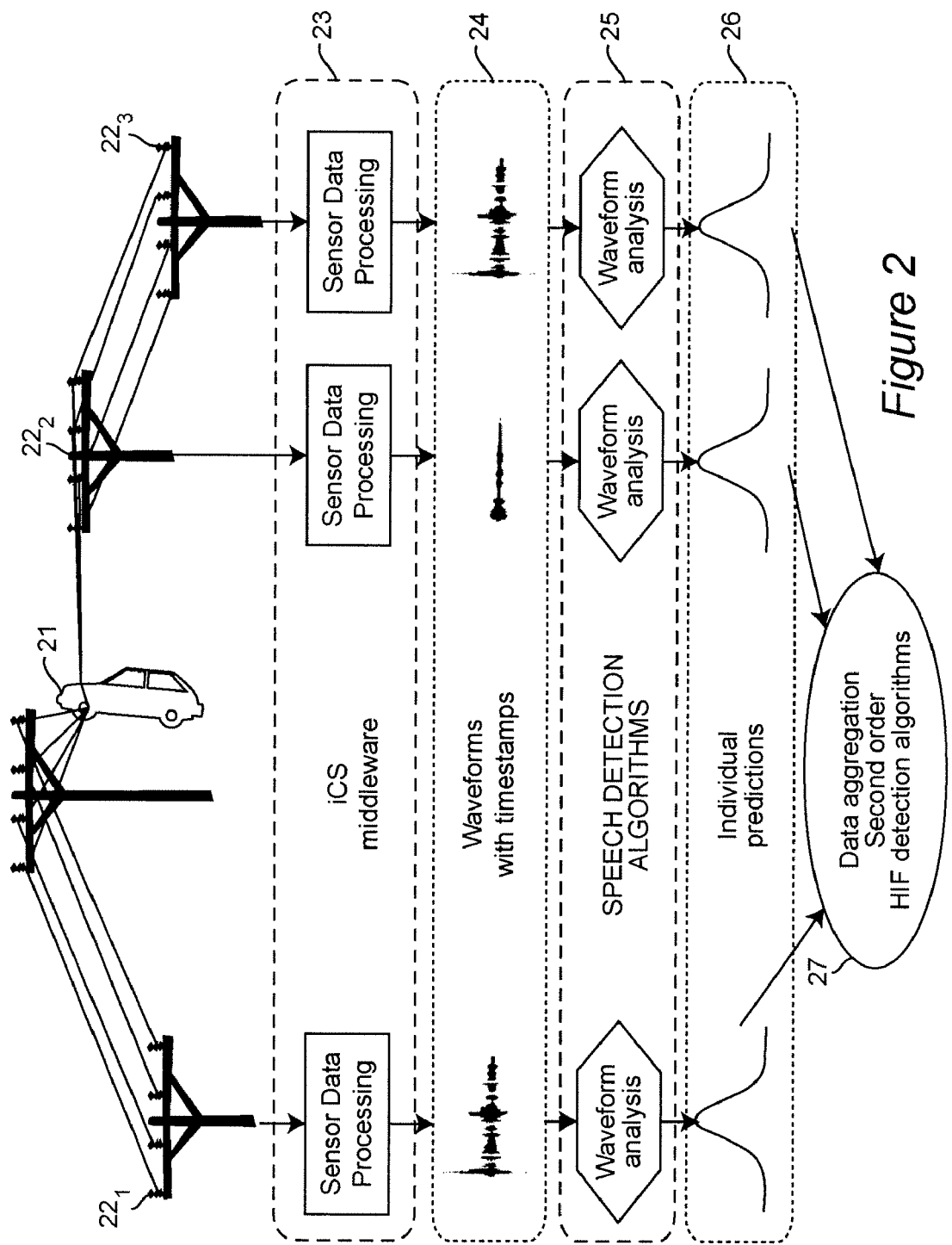
FIG. 2 is a more detailed block diagram illustrating multiple remote sensor units and their associated remote processing units and the pre-processing performed by the remote processing units.

FIG. 2 shows in more detail the processes of the high impedance fault detection system of the invention. In this illustration, a fault 21 is caused by an automobile accident in which the automobile has become entangled in the power lines, and while this is an extreme example, it is but one of many diverse causes of high impedance faults which may occur in an electrical grid. Another example occurred when the gondola of a gas balloon became entangled in power lines during the 2005 annual balloon festival in Albuquerque, N. Mex. In the case of the automobile accident, it is likely that occurrence and location would be reported by a human observer by telephone, for example, but the gas balloon incident occurred in a remote rural area requiring that the location of the accident be found by driving a pickup truck along the lines. More commonly, however, the high impedance fault could be caused by tree limbs, deteriorating insulators, the collapse of a power line pole or support, or the like. In FIG. 2, the fault has occurred between two power line support poles $22_1$ and $22_2$. It will be understood that the power lines extend beyond these two poles, and a further support pole $22_3$ is shown to illustrate this fact. Remote sensor units are deployed at each of the support poles. The remote sensor units perform digitizing of sensor data at 23 to generate signal waveforms for analysis. The signal waveforms from the sensors are sampled and time stamped at 24 by the remote sensor units, and the signal waveforms are subject to speech analysis algorithms to detect high impedance faults at 25. On the basis of this signal analysis, individual predications are generated at 26.

Only those individual predictions from remote sensor units determined to be not typical are recognized by the central processor unit. If the speech or speaker recognition software is implemented remotely, several remote processor units may be aggregated, as indicated at 27, for transmission of data to the central processor unit for analysis. This transmission can be by means of broadband power line technology (BPL) or wireless transmission or the combination of the two. For example, several remote processor units can be grouped into a wireless local area network (LAN) which communicates with a transmitter centrally located to that particular wireless local area network. If the technology used is limited to BPL, each remote processor unit would have a connection to the central processor unit to be able to be able to transmit the amount of data equivalent to two to five seconds or more of sampled readout of its associated sensor. Other technologies can be used to transmit the data.

Figure 3:
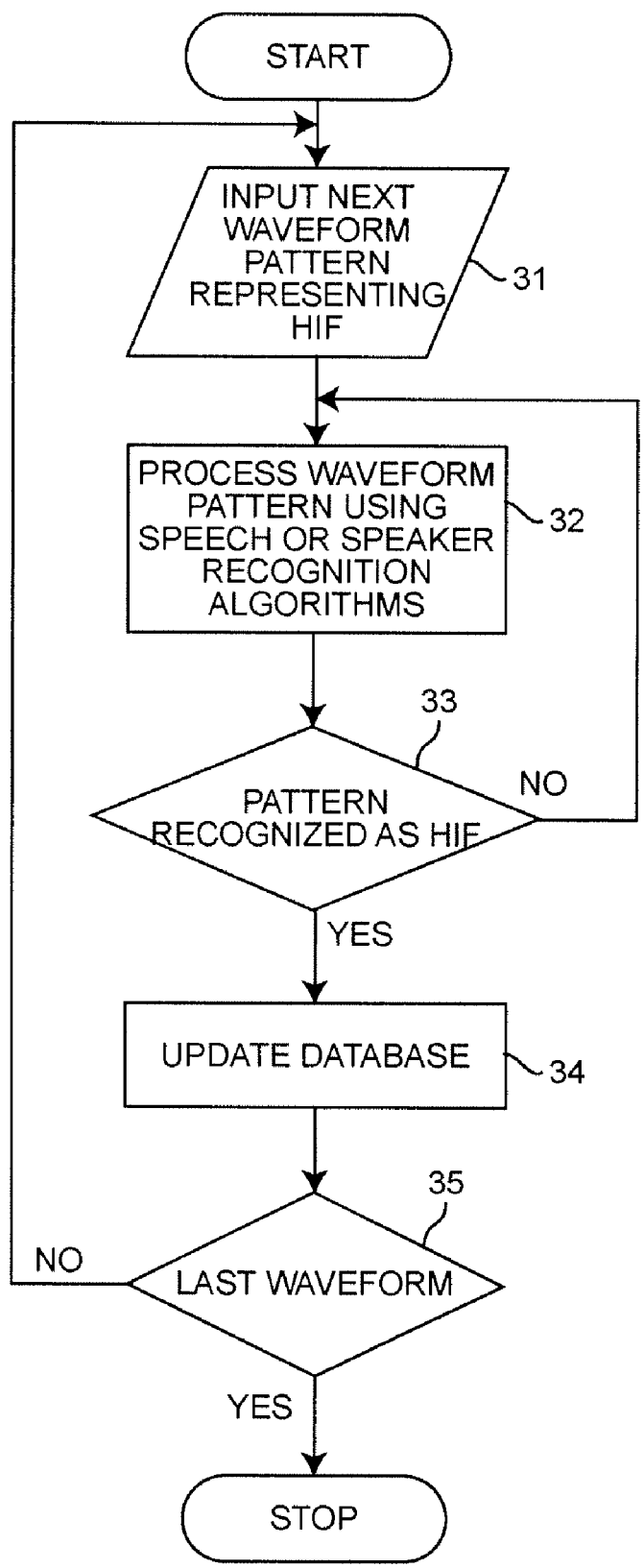
FIG. 3 is a flowchart illustrating the logic of the training process implemented by the invention.

FIG. 3 is a flowchart of the training process implemented by the invention. The process involves inputting a series of waveform patterns representing various high impedance faults. The process starts at input block 31 with the input of a waveform pattern. The input pattern is processed in function block 32 using speech or speaker recognition algorithms. A determination is made in decision block 34 as to whether the input pattern was correctly processed to recognize the input pattern. If not, the process goes back to function block 32 to again process the input pattern. This is the "training" process, much like that which is used to recognize a user's speech. When the input pattern is correctly recognized, the database is updated in function block 34. A determination is then made in decision block 35 as to whether the waveform just processed is the last waveform to be processed. If not, the process goes back to input block 31 where the next waveform pattern is input. When the last waveform is processed, the training phase is completed.

Figure 4:
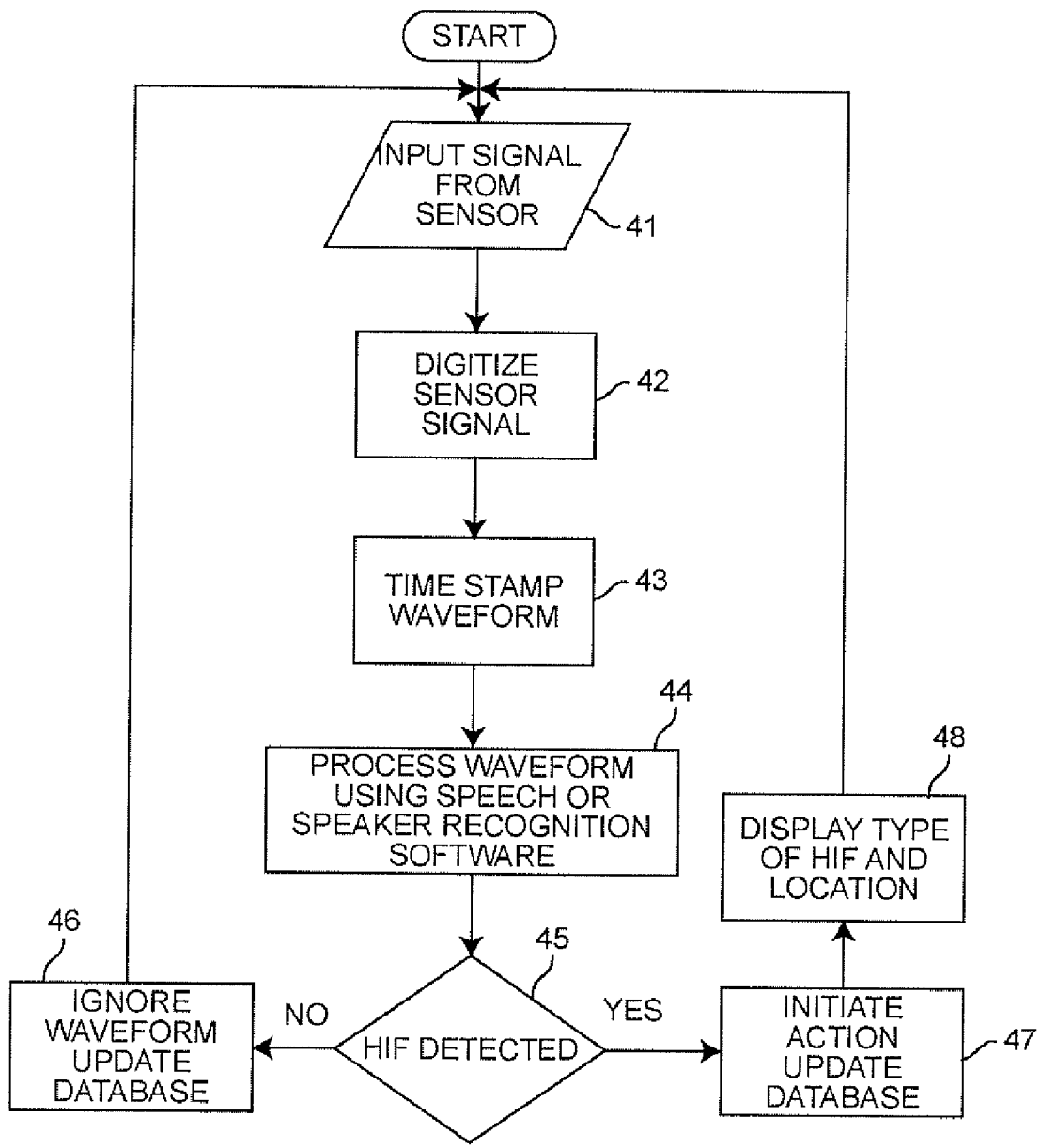
FIG. 4 is a flowchart illustrating the logic of the operational process implemented by the invention.

FIG. 4 is a flowchart of the operational process implemented by the invention. Once the training phase is completed, the speech or speaker recognition software is used on a continuous basis to analyze signals from remote sensors. The process begins with input block 41 where an input signal is received from a sensor. This input may be in response to a polling of the sensor or an interrupt from the sensor. The input signal is digitized in function block 42 and time stamped in function block 43. The waveform is then processed in function block 44 using the speech or speaker recognition software. A determination is made in decision block 45 as to whether a high impedance fault is detected. If not, the waveform is ignored, the database is updated and a return is made to input block 41. If, however, a high impedance fault is detected, an action is initiated and the database updated in function block 47. The action initiated may be either automatic or manual or a combination thereof, depending on the type of fault detected. To assist in human decision making, the type and location of the high impedance fault is displayed in function block 48 before a return is made to input block 41.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for the detection of electric faults in power grids and circuits comprising:
   a plurality of remote sensor units deployed throughout a power grid, each of said sensor units generating an output signal representative of a sensed condition;
   means associated with each of said remote sensor units for digitizing the output signal;
   means for transmitting time stamped waveform patterns of the digitized output signal; and
   a processor unit receiving the time stamped waveform patterns transmitted from said means for transmitting and analyzing said waveform patterns using speech or speaker recognition software to identify a fault condition.

2. The system for the detection of electric faults in power grids and circuits recited in claim 1, wherein said means associated with each of said remote sensor units time stamps waveform patterns of digitized output signals.

3. The system for the detection of electric faults in power grids and circuits recited in claim 2, wherein the time stamped waveform patterns are transformed and converted to acoustic waveforms which can be detected and/or analyzed by the speech or speaker recognition software.

4. The system for detection of electric faults in power grids and circuits recited in claim 2, wherein the speech or speaker recognition software is modified to accept waveforms which are not necessarily acoustically generated but to which software routines of the speech or speaker recognition software can be applied.

5. A method for the detection of electric faults in power grids and circuits, comprising the steps of:
  sensing an electrical condition at at least one location within a power grid or circuit;
  generating an output signal representative of the sensed electrical condition;
  digitizing the output signal; and
  processes the digitized output signal using speech or speaker recognition software to identify a fault condition.

6. The method for the detection of electric faults in power grids and circuits recited in claim 5, further comprising the step of time stamping waveform patterns of digitized output signals.

7. The method for the detection of electric faults in power grids and circuits recited in claim 6, further comprising the step of transforming and converting the time stamped waveform patterns to acoustic waveforms which can be detected and/or analyzed by the speech or speaker recognition software.

8. The method for detection of electric faults in power grids and circuits recited in claim 6, further comprising the step of modifying the speech or speaker recognition software to accept waveforms which are not necessarily acoustically generated but to which software routines of the speech or speaker recognition software can be applied.

* * * * *